US009848435B2

(12) United States Patent
Singh et al.

(10) Patent No.: US 9,848,435 B2
(45) Date of Patent: Dec. 19, 2017

(54) SYSTEMS AND METHODS TO ENHANCE RADIO LINK PERFORMANCE IN A MULTI-CARRIER ENVIRONMENT

(71) Applicant: APPLE INC., Cupertino, CA (US)

(72) Inventors: Ajoy K. Singh, Milpitas, CA (US);
Tarik Tabet, Los Gatos, CA (US);
Sarma V. Vangala, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/435,643

(22) Filed: Feb. 17, 2017

(65) Prior Publication Data

US 2017/0164380 A1      Jun. 8, 2017

Related U.S. Application Data

(63) Continuation of application No. 15/099,927, filed on Apr. 15, 2016, now Pat. No. 9,578,648, which is a continuation of application No. 13/930,610, filed on Jun. 28, 2013, now Pat. No. 9,320,050.

(51) Int. Cl.
| | |
|---|---|
| *H04W 4/00* | (2009.01) |
| *H04W 72/10* | (2009.01) |
| *H04W 76/02* | (2009.01) |
| *H04W 72/02* | (2009.01) |
| *H04W 72/04* | (2009.01) |

(52) U.S. Cl.
CPC ........... *H04W 72/10* (2013.01); *H04W 72/02* (2013.01); *H04W 72/0453* (2013.01); *H04W 76/025* (2013.01)

(58) Field of Classification Search
CPC ..................................................... H04W 72/04
See application file for complete search history.

(56) References Cited

U.S. PATENT DOCUMENTS

| | | | |
|---|---|---|---|
| 2011/0038333 A1 | 2/2011 | Yi et al. | |
| 2012/0057560 A1* | 3/2012 | Park .................... | H04L 1/08 370/329 |
| 2015/0009826 A1* | 1/2015 | Ma .................... | H04W 28/0268 370/235 |

FOREIGN PATENT DOCUMENTS

| | | |
|---|---|---|
| JP | 2012-205039 | 10/2012 |
| JP | 2013-502132 | 1/2013 |

* cited by examiner

*Primary Examiner* — Afshawn Towfighi
(74) *Attorney, Agent, or Firm* — Fay Kaplun & Marcin, LLP

(57) ABSTRACT

Described herein are systems and methods to enhance radio link performance in a multi-carrier environment. A method may comprise sending, by an upper level layer of a wireless device, user data in a packet for transmission, wherein the packet includes an indication of a level of priority of the packet, receiving, by a media access control ("MAC") layer of the wireless device, the packet for transmission including the indication of the level of priority provided by the upper level layer, identifying, by the MAC layer, a reliability of each of a plurality of component carriers, and selecting, by the MAC layer, one of the component carriers on which to transmit the packet, wherein the selecting is based on the level of priority of the packet and the reliability of the one of the component carriers.

20 Claims, 9 Drawing Sheets

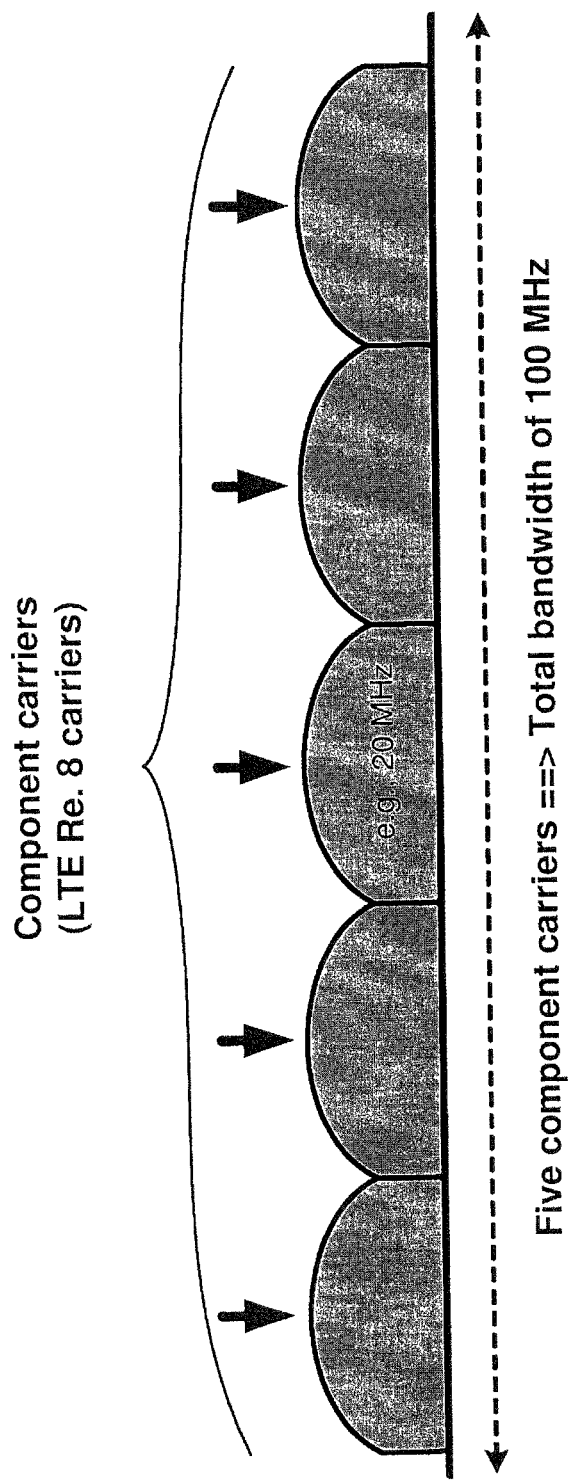

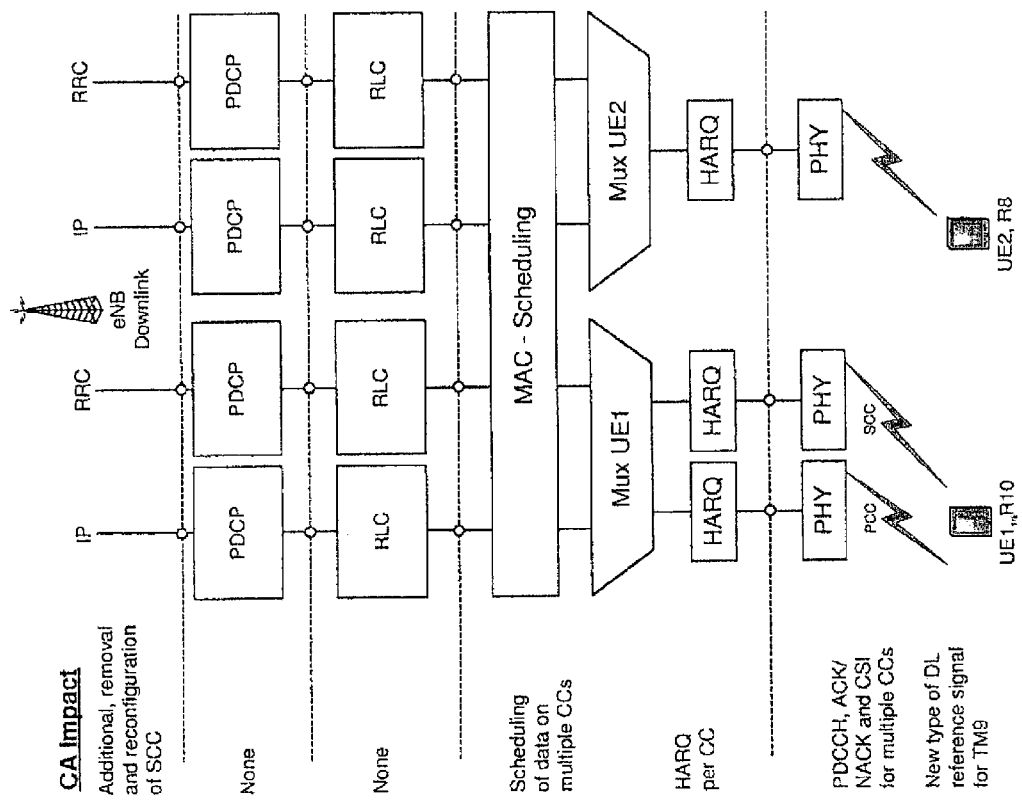

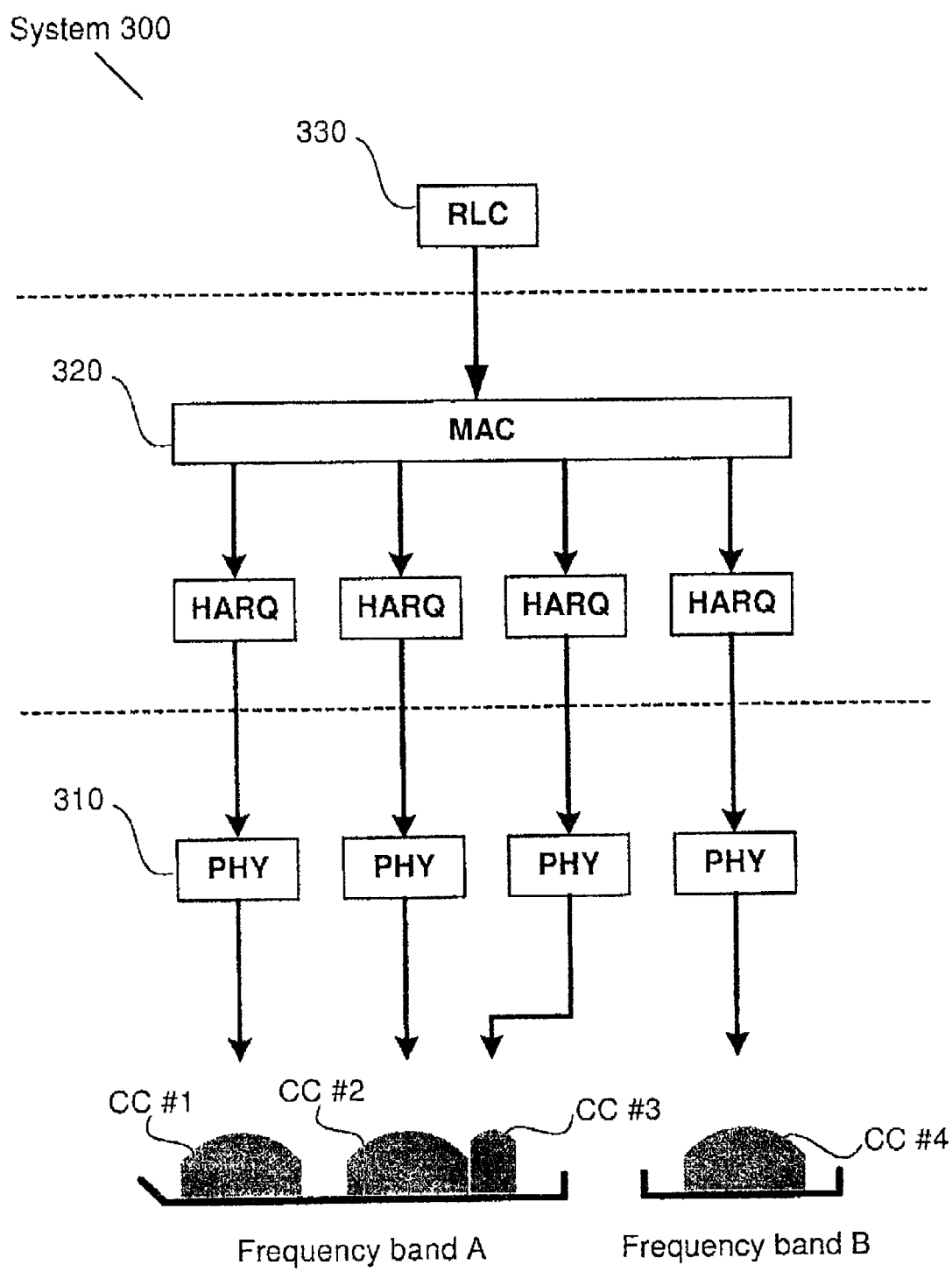

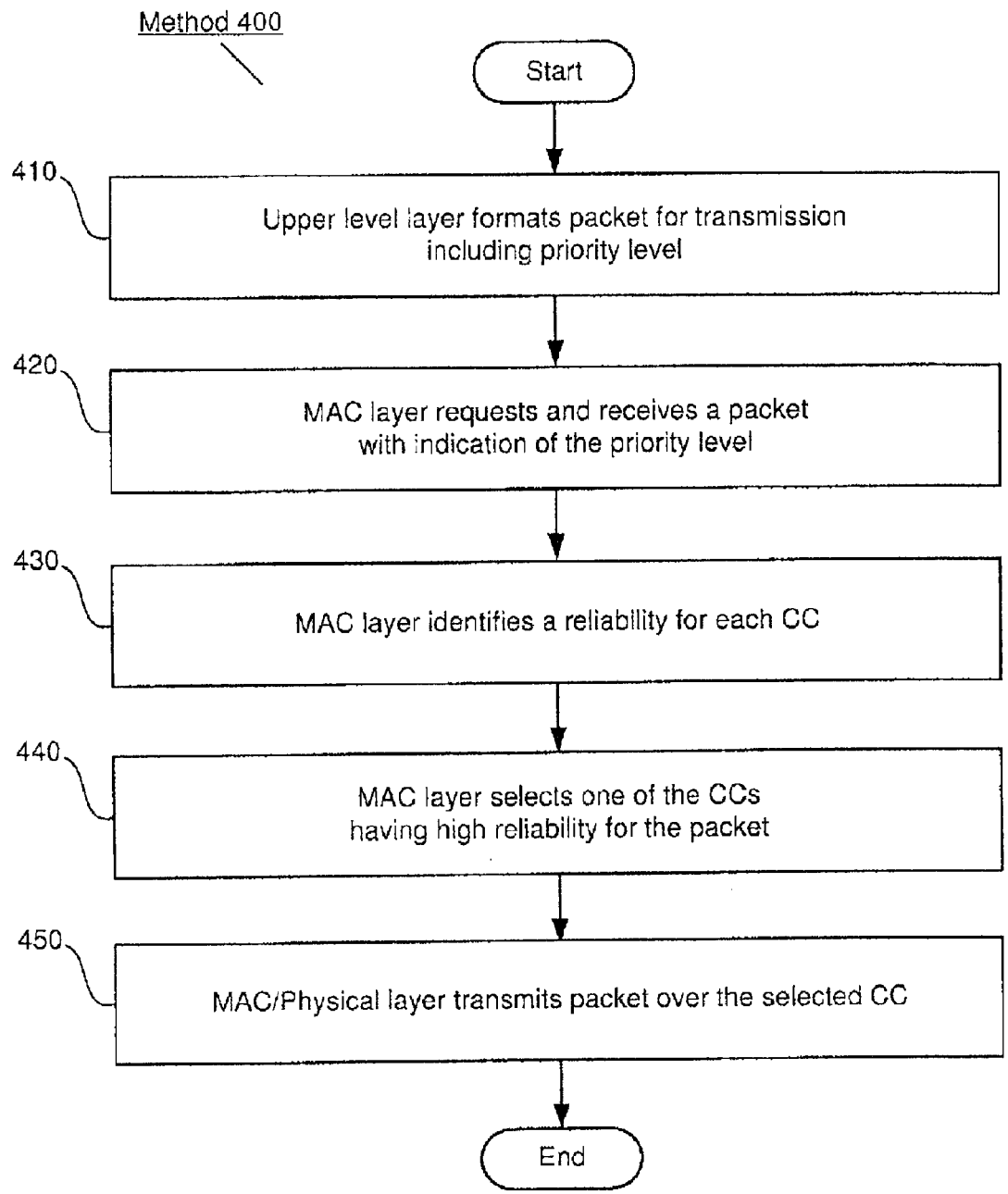

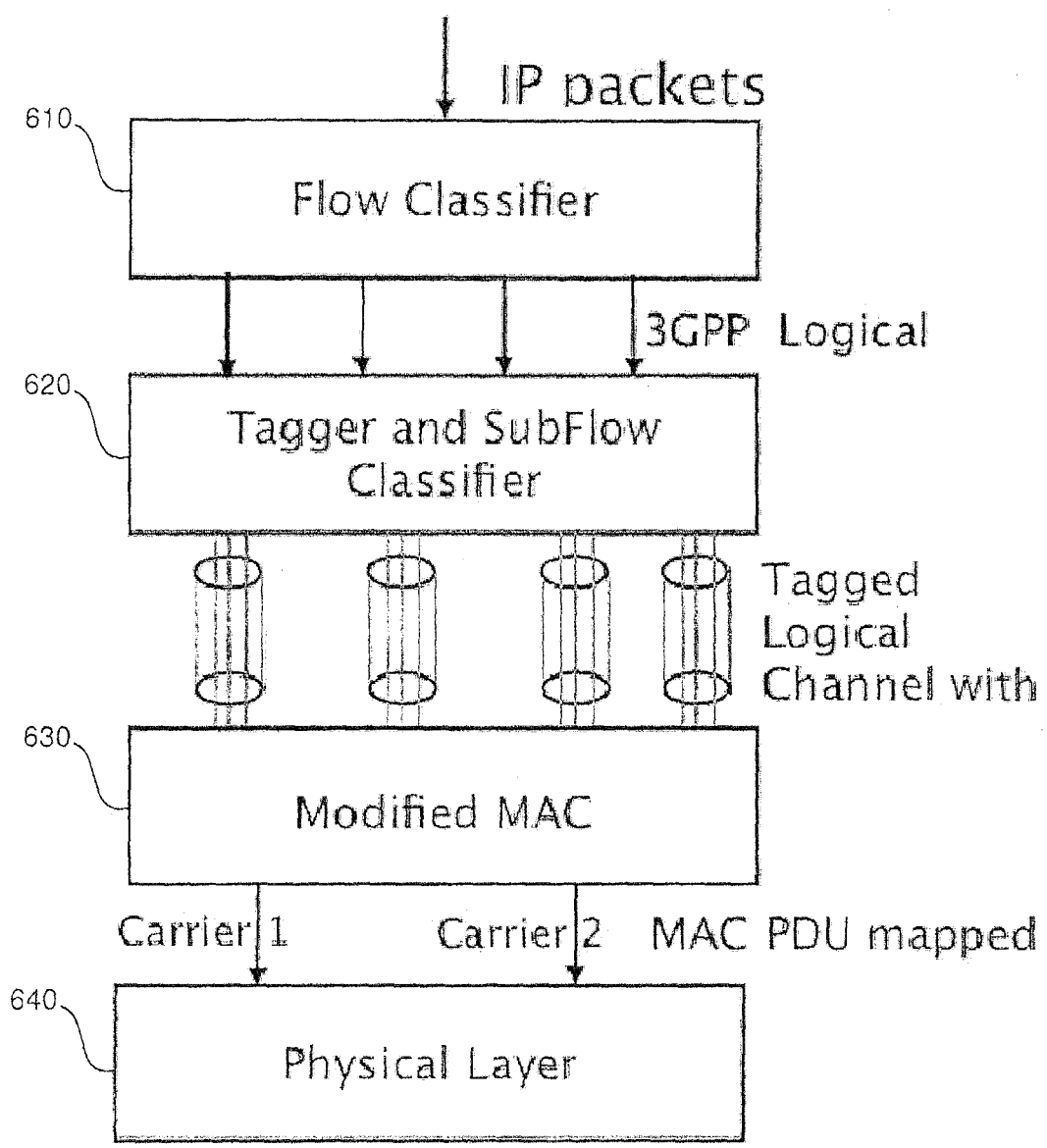

SYSTEMS AND METHODS TO ENHANCE RADIO LINK PERFORMANCE IN A MULTI-CARRIER ENVIRONMENT

BACKGROUND

Long-term evolution ("LTE") is a wireless communication standard used for high-speed data for mobile devices and data terminals. LTE-Advanced is a major enhancement to the LTE standard. Within the LTE-Advanced standard, carrier aggregation is used to increase the bandwidth, and thereby increase the bitrates. Carrier aggregation has been introduced in the 3rd Generation Partnership Project ("3GPP") Release 10 (LTE-Advanced standard) to provide wider than 20 MHz transmission bandwidth to a single device (e.g., user equipment or "UE") while maintaining the backward compatibility with legacy UEs.

Under the current standards, each aggregated carrier is referred to as a component carrier, and each component carrier can have a bandwidth of 1.4, 3, 5, 10, 15 or 20 MHz and a maximum of five component carriers can be aggregated. As illustrated in FIG. 1, five component carriers may each have a bandwidth of 20 MHz to combine for a total bandwidth of 100 MHz. With carrier aggregation features enabled, the LTE-Advanced standard may meet peak downlink ("DL") throughput requirement, or 1 Gbps.

DESCRIPTION OF THE DRAWINGS

FIG. 1 shows an example of carrier aggregation including five component carriers having a bandwidth of 20 MHz for a total bandwidth of 100 MHz.

FIG. 2 shows the protocols for the LTE standard along with the main changes due to carrier aggregation.

FIG. 3 shows a partial view of a network stack that may be implemented on a wireless device and an example of carrier aggregation being performed using the exemplary network stack.

FIG. 4 shows an exemplary method to enhance radio link performance in a multi-carrier environment.

FIG. 6 shows an exemplary system for implementing enhanced eNodeB and UE.

DETAILED DESCRIPTION

Figure 5A:
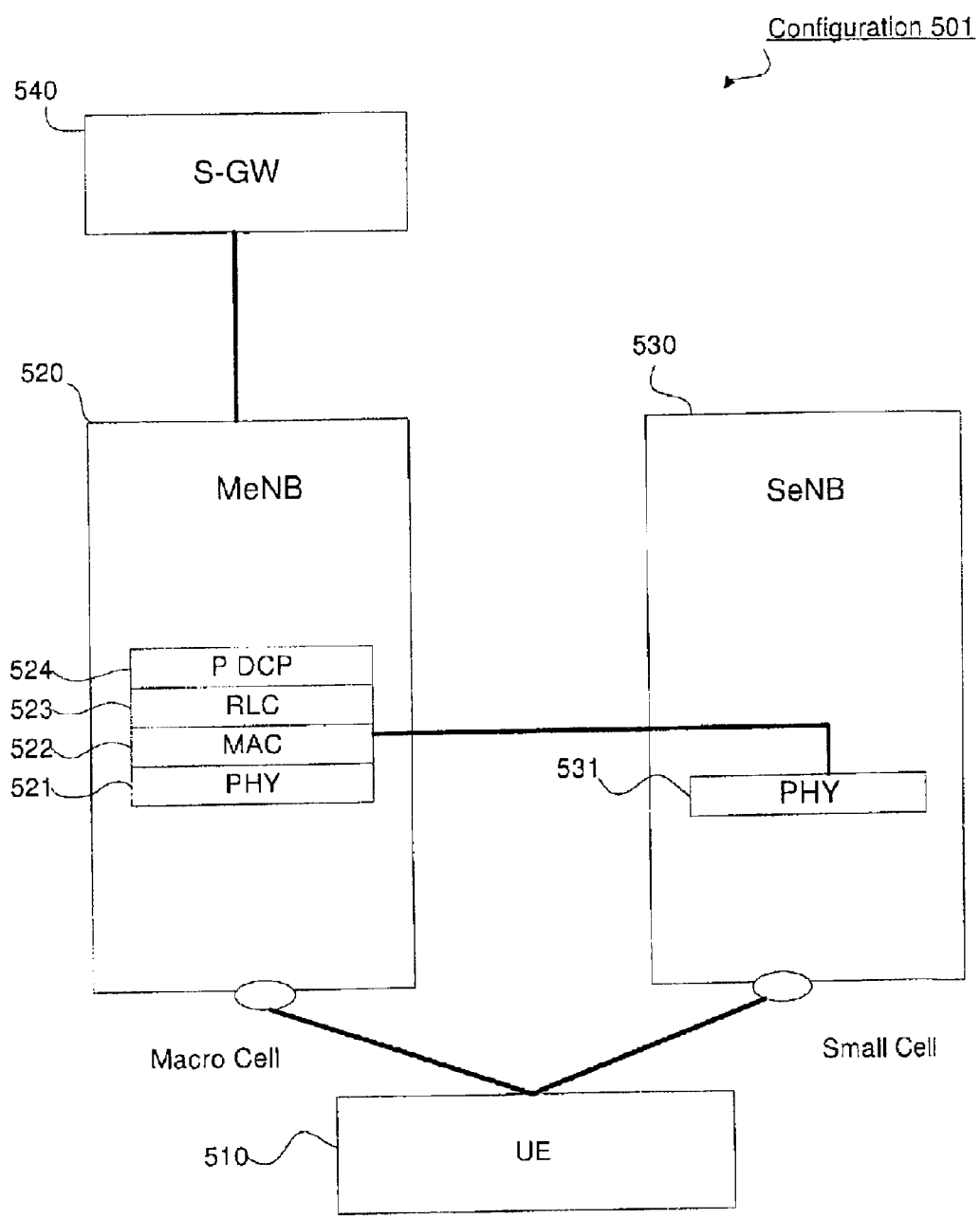
FIGS. 5A-5D show an exemplary system to enhance radio link performance in a multi-carrier environment.

Described herein are systems and methods to enhance radio link performance in a multi-carrier environment. A method may comprise sending, by an upper level layer of a device (e.g., a wireless device or user equipment ("UE")), user data in a packet for transmission, wherein the packet includes an indication of a level of priority of the packet, such as a high priority or a low priority. Furthermore, a high priority packet may be one of a retransmitted packet, a user data packet including an acknowledgment of packet receipt (e.g., TCP-ACK), a packet including robust header compression ("ROHC") feedback, or a packet including real-time transport protocol ("RTP") control protocol ("RTCP") feedback. The method may also include receiving, by the media access control ("MAC") layer of the device, the packet for transmission including the indication of the level of priority provided by the upper level layer, and identifying, by the MAC layer, a reliability of each of a plurality of component carriers. The method may further include selecting, by the MAC layer, one of the component carriers on which to transmit the packet, wherein the selecting is based on the level of priority of the packet and the reliability of the one of the component carriers.

Further described herein is a device comprising a non-transitory memory having a program stored thereon, and a processor executing the program, wherein the execution of the program causes the processor to perform operations comprising sending, by an upper level layer of the device, user data in a packet for transmission, wherein the packet includes an indication of a level of priority of the packet, receiving, by a MAC layer of the device, the packet for transmission including the indication of the level of priority provided by the upper level layer, identifying, by the MAC layer, a reliability of each of a plurality of component carriers, and selecting, by the MAC layer, one of the component carriers on which to transmit the packet, wherein the selecting is based on the level of priority of the packet and the reliability of the one of the component carriers.

Further described herein is a non-transitory computer readable storage medium with an executable program stored thereon, wherein the program instructs a processor to perform operations comprising sending, by an upper level layer of a wireless device, user data in a packet for transmission, wherein the packet includes an indication of a level of priority of the packet, receiving, by a media access control ("MAC") layer of the wireless device, the packet for transmission including the indication of the level of priority provided by the upper level layer, identifying, by the MAC layer, a reliability of each of a plurality of component carriers, and selecting, by the MAC layer, one of the component carriers on which to transmit the packet, wherein the selecting is based on the level of priority of the packet and the reliability of the one of the component carriers.

The exemplary embodiments may be further understood with reference to the following description and the appended drawings, wherein like elements are referred to with the same reference numerals. The exemplary embodiments show systems and methods to enhance radio link performance in a multi-carrier environment. More specifically, the exemplary embodiments described herein may allow for an upper level layer of the radio traffic stack to influence carrier selection and thus, optimize end-to-end application performance.

The exemplary embodiments are described with reference to the LTE-Advanced carrier aggregation scheme that has certain characteristics. For example, in frequency-division duplexing ("FDD"), the characteristics include that the number of aggregated carriers may be different in DL and uplink ("UL"), typically, the number of UL component carriers is equal to or lower than the number of DL component carriers. In addition, the individual component carriers may also be of different bandwidths. Alternatively, when time division duplexing ("TDD") is used, the number of component carriers and the bandwidth of each component carrier are the same for DL and UL. However, those skilled in the art will understand that the exemplary embodiments may be applied to any carrier aggregation scheme including those having different characteristics from the LTE-Advanced scheme.

When carrier aggregation is used, there may be a number of serving cells for each of the component carriers. The coverage of the serving cells may differ due to both component carrier frequencies and power planning, which is useful for heterogeneous network planning. A radio resource control ("RRC") connection is handled by one cell, namely the primary serving cell ("PCell"), served by the primary component carrier ("PCC") for uplink ("UL") and downlink ("DL"). It is also on the DL PCC that the UE receives non-access stratum ("NAS") information, such as security parameters. In idle mode, the UE listens to system information on the DL PCC. The UL PCC is used to send the physical uplink control channel ("PUCCH").

The other component carriers maybe referred to as secondary component carriers ("SCC") for UL and DL, serving the secondary serving cells ("SCells"). The SCCs are added and removed as required, while the PCC is changed at handover. Those skilled in the art will understand that the PCell and SCells are logical constructs allowing for the addition of SCells as needed. The PCell is the main cell that is used for all RRC signaling and control procedures. In carrier aggregation, the SCell is considered an augmentation to the PCell, wherein SCell activation and deactivation is achieved quickly by MAC signaling. The functionality of conventional carrier aggregation is implemented at the MAC layer and below in the user plane. Accordingly, the packet data convergence protocol ("PDCP") layer and the radio link control ("RLC") layer do not have any influence on which carrier particular RLC and PDCP protocol data units ("PDUs") should be sent. It is noted that the terms packet and PDU may be used interchangeably throughout the descriptions herein.

FIG. 2 shows the protocols for the LTE standard along with the main changes due to carrier aggregation. Specifically, the introduction of carrier aggregation mainly influences the MAC and the physical layer protocol. However, some new RRC messages are also introduced. For instance, while the PDCP and RLC may be treated as before carrier aggregation, information such as new RRC messages are now needed to handle the SCC, and the MAC layer must be able to handle scheduling on a number of component carriers. Changes on the physical layer are, for example, that signaling information about scheduling on component carriers as well as a hybrid automatic repeat request ("HARQ") ACK/NACK per component carrier must be carried.

A scheduler makes scheduling decisions in both the uplink and downlink transmissions and selects an appropriate carrier and a transport block size. Specifically, the scheduler determines which UEs should be granted resources in the uplink based on information such as channel quality measurements, scheduling requests and buffer status reports. In the downlink, the UE will receive a POOCH resource allocation. Once a scheduling decision has been made, the scheduler informs the MAC about the scheduling decision by sending an uplink grant to inform the UE MAC about the UL scheduling decision. Furthermore, the scheduler uses an implementation specific mechanism to inform evolved Node B ("eNodeB") MAC about the DL scheduling decision.

FIG. 3 shows a partial view of a network stack 300 that may be implemented on a wireless device. The exemplary layers that are illustrated include the physical layer PHY 310, the MAC layer 320, and the RLC layer 330. Those skilled in the art will understand that the network stack may include additional layers above the RLC layer 330 such as a PDCP layer, RRC layer, application layer, etc. All the layers above the MAC layer 320 may be singularly or collectively referred to as upper level layer(s). Different wireless devices may implement different types of network stacks and different network stacks may have different combinations of the layers described herein or additional layers not mentioned here.

Those skilled in the art will also understand that the network stack 300 may be implemented on the wireless device as a combination of hardware and software. For example, the wireless device may include hardware components such as processors, non-transitory storage mediums (e.g., RAM, flash drives, etc.), transceivers, antennas, etc. The non-transitory storage medium may store multiple software components such as an operating system ("OS"), applications, etc., that are executed by the processor(s) to operate and control the wireless device. One or more of the software components may be executed by the processor to implement the network stack 300. It should be noted that the wireless device may include any device that is configured to send and/or receive wireless signals, including, for example, those devices generally referred to as user equipment ("UE") (e.g., mobile phones, smart phones, tablets, laptops, etc.) as well as network devices (e.g., base stations, eNodeB, etc.)

FIG. 3 further shows an example of carrier aggregation being performed using the exemplary network stack 300. As soon as the MAC layer 320 learns about the scheduling grant, the MAC layer 320 queries the RLC layer 330 to obtain RLC PDUs and formats MAC PDUs by adding an appropriate MAC header. The MAC layer 320 then sends the user data to a lower layer for HARQ processing and to the PHY layer 310 for transmission. It may be noted that while the RLC layer 330 sends its PDUs to the MAC layer 320 upon receiving a request from the MAC layer 320, the mapping of the RLC PDUs to its appropriate carrier is not influenced by the RLC/PDCP layers in conventional carrier aggregation. To support carrier aggregation, a further downlink scheduler ("DL-SCH") is simply added at the MAC layer 320 and the RRC is modified to support re-configuration of the SCC. The MAC layer 320 (e.g., multiplexing UE) function is responsible to decide on which carrier the user data (e.g., MAC PDU) should be sent over which carrier. Accordingly, in conventional carrier aggregation, it is possible that high priority RLC PDUs are sent over a carrier having poor radio link conditions.

According to the systems and methods described herein, the exemplary embodiments may allow for the RLC layer 330, or any of the other upper level layers (e.g., the PDCP layer), to influence a MAC carrier selection algorithm to optimize end-to-end application performance. More specifically, the upper level layers may categorize data belonging to each logical channel based on an assigned priority level (e.g., a high priority, a low priority, etc.). For instance, the RLC/PDCP may categorize certain traffic as belonging to a given logical channel as high priority. This traffic may include, but is not limited to, retransmitted RLC PDUs, user data containing TCP-ACK, PDUs containing ROHC feedback, PDUs containing RTCP feedback, any other urgent application layer signaling (e.g., video i-frames, etc.), etc. Those skilled in the art will understand that traffic may be categorized as high priority, low priority, or any intermediate level(s) of priority based on any factors decided by the system designers.

The exemplary systems and methods described herein allow for the MAC carrier selection algorithm to transmit high priority RLC data over more reliable carriers. For instance, the MAC layer 320 may maintain a quality level of each individual carrier to categorize the carrier as high priority or low priority. Examples of metrics that may be employed by the MAC layer 320 may include, but are not limited to, channel quality metrics from UL signals as sounding reference signals ("SRSs"), UE feedback as channel state information ("CSI") and reference signal received power/reference signal received quality ("RSRP/RSRQ"). Additional metric examples include block error ratio ("BLER") estimation from acknowledgement ("ACK") and non-acknowledgement ("NACK") transmissions in UL, MAC/RLC layer retransmission and segmentation patterns of each individual carrier, etc. From these examples, it should be clear that any reliability metric may be selected to monitor carrier reliability. It is noted that the UE may also evaluate the quality of an uplink carrier by measuring DL metrics. Accordingly, the UE may utilize this information to prioritize uplink transmissions over different carriers.

As noted above, while an exemplary embodiment may implement two levels of priority (e.g., high and low), those skilled in the art will understand that any number of incremental priority levels may be utilized by these systems and methods for the upper level layers to categorizing data belonging to a logical channel. In one example, retransmitted PDUs may be assigned the highest level of priority by the RLC/PDCP layer such that retransmitted PDUs are transmitted over the most reliable carrier. Whereas application layer signaling may be assigned the next highest level of priority such that this data may be transmitted over the most reliable carrier or a carrier that is a level below the most reliable.

Thus, as can be seen from the above description, the MAC layer 320 may maintain an ongoing measure of the reliability of each carrier. The RLC/PDCP layer, or any other upper level layer, may assign a priority level to each PDU. When the MAC layer 320 learns of any scheduling grant, the MAC layer 320 may query the RLC layer 330 to request the RLC PDUs. Upon receiving the request, the RLC layer 330 may send the PDUs to the MAC layer 320 for transmission, or more properly, to be further prepared by the MAC layer 320 for transmission. However each RLC PDU may include the priority level assigned by one of the upper level layers. The MAC layer 320 may use the assigned priority level to select the appropriate carrier for the PDU. This selection may be based on the assigned priority level and the reliability measure of each carrier that is maintained by the MAC layer 320. In this manner, the upper level layers (e.g., RLC/PDCP layers) may have an effect on the carrier that is selected for individual PDUs.

FIG. 4 shows an exemplary method 400 to enhance radio link performance in a multi-carrier environment. The operations performed by the method 400 will be described in reference to the exemplary network stack 300 implemented by a wireless device and its components described above with reference to FIG. 3.

In step 410, an upper level layer of a wireless device may format a packet for transmission. For instance, the upper level layer may be the RLC layer 330 or the PDCP layer. The upper level layer may include an indication of a level of priority of the packet, such as high priority or low priority. For example, packets that are retransmitted packets, user data packets including a TCP-ACK, packets including ROHC feedback, or packets including RTCP feedback may be identified as high priority packets. According to one embodiment indicating a priority level in the packet, a user may maintain implementation specific metadata associated with each packet. This metadata may contain information about each packet's priority, etc. It is noted that the priority information may not be transmitted over the air, hence it is not necessary to modify the headers of any PDCP/RLC/MAC layers PDU in order to classify the packet(s) as high priority or low priority. In addition, it is also possible to maintain separate queues for high or low priority PDUs.

In step 420, the MAC layer 320 may request a packet from the RLC layer 330 for transmission. The MAC layer 320 may receive the packet including the indication of the level of priority provided by the upper level layer. In this case, the MAC layer 320 may also indicate to the RLC layer 330 that the MAC layer 320 is looking for higher priority PDUs from the RLC layer 330. Accordingly, the RLC layer 330 may first send all high priority PDUs to the MAC layer 320 prior to sending any lower priority PDUs.

In step 430, the MAC layer 320 may identify a reliability of each of a plurality of component carriers. As noted above, the MAC layer 320 may utilize any number of metrics to identify the reliability of each of the component carriers. For instance, these metrics may include channel quality metrics from UL signals as sounding reference signals ("SRSs"), UE feedback as channel state information ("CSI") and reference signal received power/reference signal received quality ("RSRP/RSRQ"). It should also be noted that the monitoring of the carriers may be an ongoing process as the performance of individual carriers may change over time. It should further be noted that the reliability of the individual carriers is typically a relative measure against the other available carriers. Thus, a UE in a first location may have a carrier that is assigned to low priority traffic that has better absolute reliability than a carrier for a UE in a second location assigned to high priority traffic because all the carrier of the first UE are absolutely better than the carriers available to the second UE. It is also possible that the UE may identify the reliability of the uplink carrier by measuring the channel quality of downlink carriers. In this case, the UE may decide to map higher priority packets to better quality carriers without requiring eNodeB support.

In step 440, the MAC layer 320 may select one of the component carriers having a reliability corresponding to the priority of the packet. For example, a high reliability carrier may be selected when the packet is indicated as a high priority packet.

In step 450, the MAC layer 320 may format the packet for transmission by adding the MAC layer header and passing the packet to the PHY layer 310, which will transmit the packet over the selected component carrier, as shown by the example component carrier in FIG. 3. Accordingly, the transmission of the packet over the component carrier selected in step 440 ensures that each of the retransmitted packets, such as high priority PLC PDUs, are transmitted over the most reliable carrier and the method 400 provides the upper level layers with a say over which carriers are used for a particular packet or groups of packets.

In addition to the basic transmission functionality described above, the combination of carrier aggregation and upper level layer influence on carrier selection may include other forms of improved packet transmission. For example, the MAC layer 320 may decide to send the same user data simultaneously over the multiple carriers. Accordingly, the receiver HARQ entity may then combine multiple HARQ PDUs containing redundant information to decode the original transmitted data. According to a first embodiment, the same HARQ PDU may be sent on both carriers. The transmitting UE may benefit from the repetition of the packet. This embodiment may create the same gain as HARQ chase combining. The two packets (e.g., HARQ PDUs) may then be encoded in the same manner at the physical layer. Thus, not only may the packets contain the same bit information, the transmission packets may also be similar.

According to a further embodiment of HARQ PDU encoding, two HARQ PDUs may be created out of the same information bit. Specifically, a first HARQ PDU may correspond to retransmission 0 (e.g., using redundancy version 0) and a second HARQ PDU may correspond to a retransmission 1 (e.g., using redundancy version 1). As the first HARQ PDU may use more systematic bits, the first HARQ PDU may go to the best carrier (e.g., the carrier having the higher channel quality). Conversely, the second HARQ PDU of retransmission 1 may go to the carrier having the worst quality. The receiving UE may then combine both PDUs to create the same gain as incremental redundancy. By utilizing the multiple HARQ PDUs described above, reliability and latency may be improved at the receiving UE. For example, a typical HARQ is designed such that the number of retransmissions needed for successful decoding is around 1.1, assuming a target BLER of 10%. The multiple HARQ PDUs allow the UE to successfully decode the packet in 1 subframe (1 ms).

In the case where a base station (e.g., evolved Node B ("eNB")) is sending the same information on both carriers, the eNB may inform the receiving UE that the UE may combine both HARQ PDUs. The eNB may provide this information via the PDCCH by including a bit of information or a flag to indicate to the UE that the UE is to combine the HARQ PDUs across the two carriers. The UE may then understand that the same HARQ process is used across the two carriers. The redundancy version in PDCCH of each carrier may be used by the UE to optimally combine the two physical layer blocks, such as, for instance, in an incremental redundancy manner, in a chase combining manner, etc.

It is noted that while exemplary embodiments described herein operate using downlink transmission (e.g., "downlinking" user data), those skilled in the art will understand that the exemplary systems and methods are also applicable during uplink transmission (e.g., "uplinking" user data). Accordingly, an exemplary wireless device for sending user data in a packet for transmission may be, for instance, the UE uplinking the user data to a wireless network or a base station (e.g., eNB) downlinking the user data to the UE.

In another exemplary use case, the carrier aggregation scheme described herein may be implemented in the context of a small cell where the small cell implements one carrier and the macro cell implements another carrier. FIGS. 5A-5D show four different possible small cell configurations 501-504. Each of the small cell configurations 501-504 include a serving gateway (S-GW) 540, a macro evolved Node B ("MeNB") 520, and a source evolved Node B ("SeNB") 530. In the exemplary configurations 501-504, the macro and small cells are transmitting PDUs to a UE 510.

The differences between the configurations 501-504 illustrated in FIGS. 5A-5D is the number and type of layers that implemented into the SeNB 530. Accordingly, the exemplary systems and methods described herein may be applied to each of the architectures illustrated in FIGS. 5A-5D in order to implement dual connectivity solutions. Each of the nodes, MeNB 520 and the SeNB 530, may include a plurality of layers, such as a physical layer (PHY 521/531), a media access control layer (MAC 522/532), a radio link control layer (RLC 523/533), and a packet data convergence protocol layer (PDCP 524/534). Furthermore, each of the eNBs may use X2 links for coordination if MAC/RLC entities are not implemented on the same cell.

FIG. 5A shows a configuration 501 where the SeNB 530 only includes the physical layer 531. In this case, the MAC layer 522 of the MeNB 520 will control the flow of packets to and from the physical layers 521 and 531 of the MeNB 520 and the SeNB 530, respectively. That is, the MAC layer 522 of the MeNB 520 will receive packets from the upper level layers (e.g., RLC layer 523 and PDCP 524) of the MeNB 520 and select the carrier that is either corresponding to the physical layer 521 of the MeNB 520 or the physical layer 531 of the SeNB 530 and forward the PDU to the appropriate physical layer 521/531. The selection of the carrier is done in the same manner as was generally described above with reference to FIG. 3.

Figure 5B:
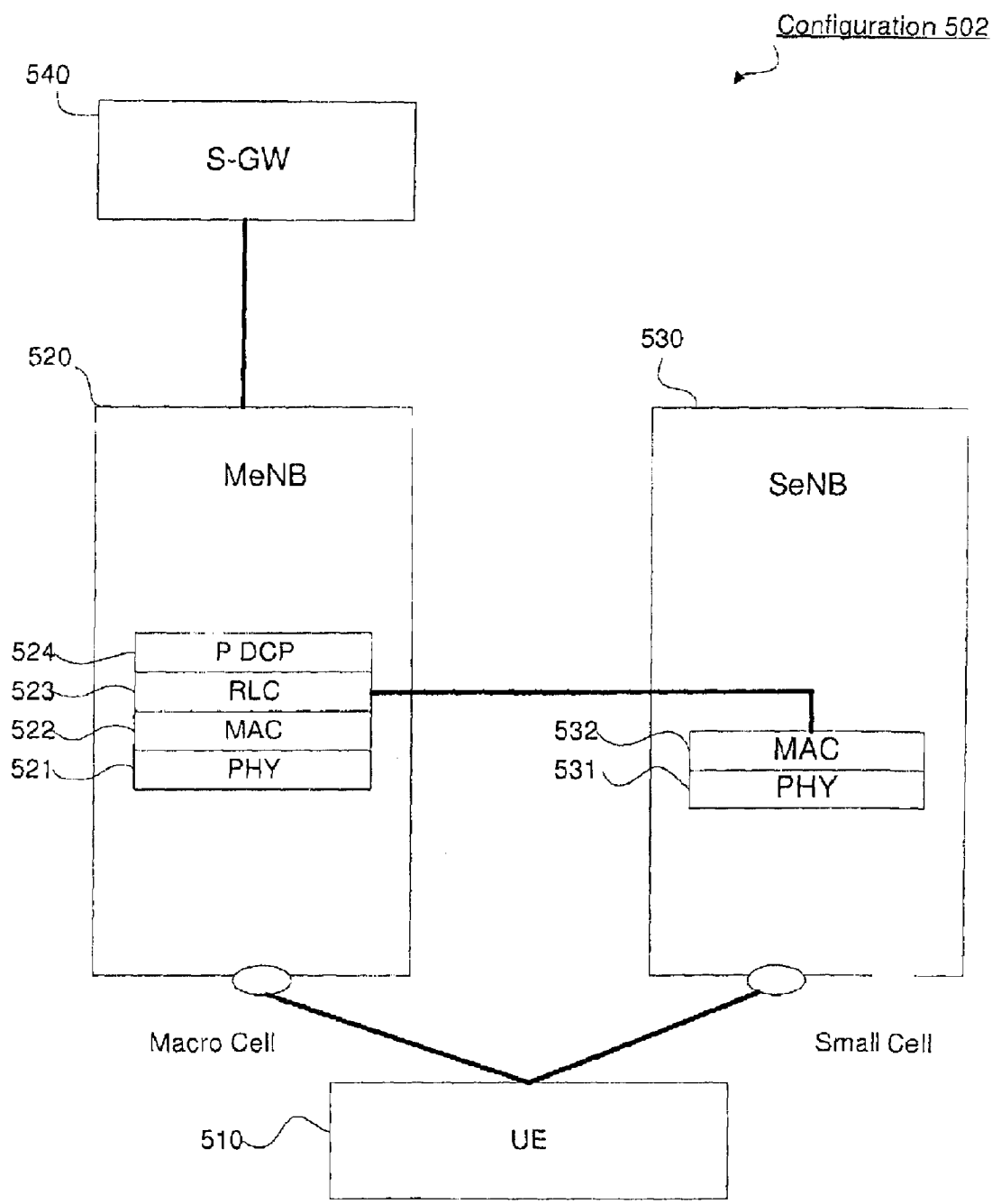

FIG. 5B shows a configuration 502 when the SeNB 530 includes both the physical layer 531 and the MAC layer 532. In this configuration 502, the PDCP layer 524 and RLC later 523 of the MeNB 520 may generate the PDUs for transmission. However, both the MAC layer 522 of the MeNB 520 and the MAC layer 532 of the SeNB 530 may query the RLC layer 523 for PDUs for transmission. Because both MAC layers 522/523 may query the RLC layer 523, the X2 interface links may be utilized between the MeNB 520 and the SeNB 530 to coordinate the querying of the RLC layer 523. Again, each of the MAC layers 522/532 may select the appropriate carrier in accordance with the exemplary method 400 described in FIG. 4 for those PDUs received from the RLC layer 523.

Figure 5C:
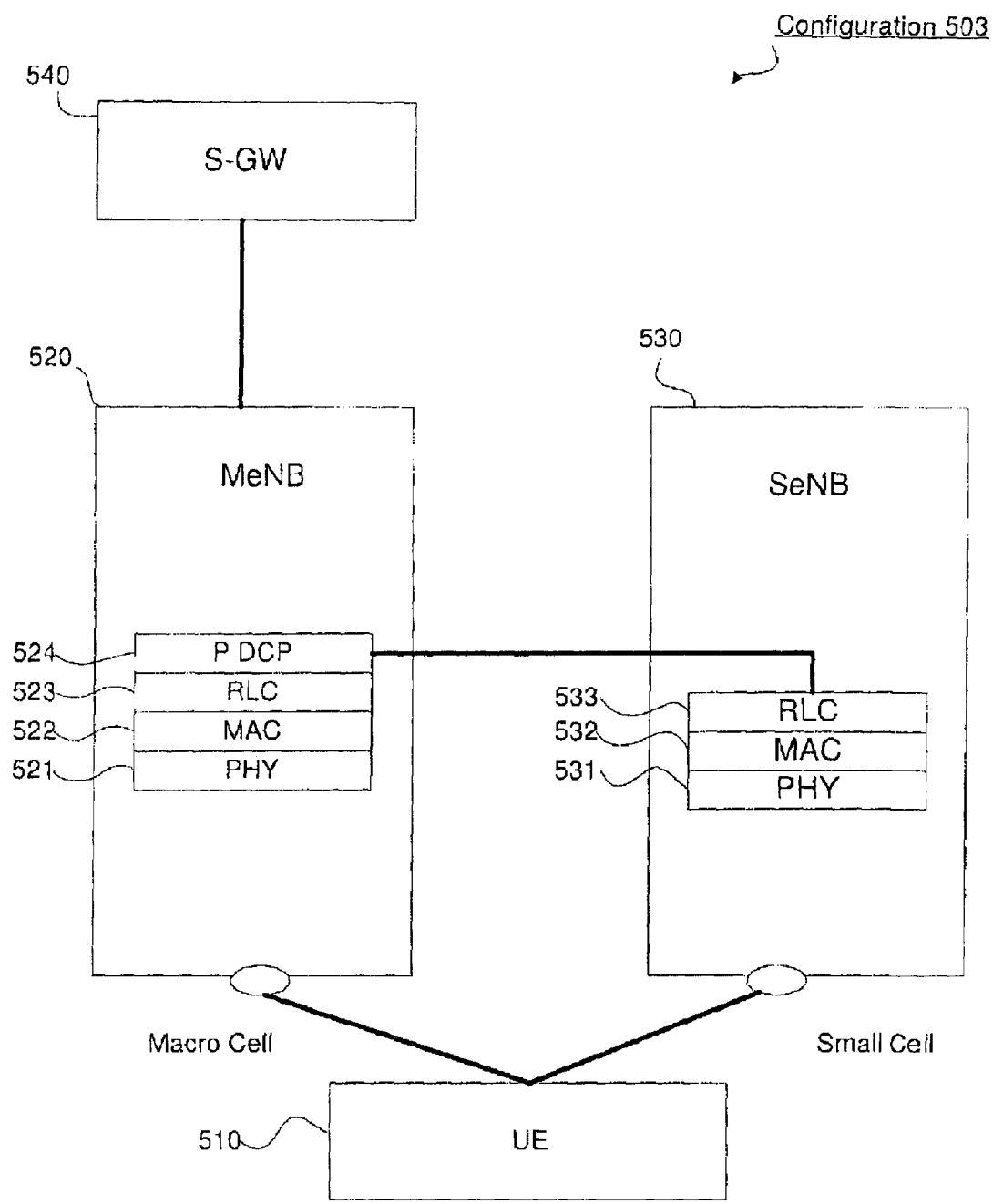

FIG. 5C shows a configuration 503 where the SeNB 530 includes the physical layer 531, the MAC layer 532 and an RLC layer 533. In this case, either of the RLC layers 523/533 may receive PDUs from the PDCP layer 524 of the MeNB 520. Similar to the configuration 502 of FIG. 5B, since the MAC and RLC layers are distributed between the MeNB 520 and SeNB 530, the X2 interface links need to be used to coordinate how the PDCP layer 524 PDUs are sent to the different RLC layers 523/533.

Figure 5D:
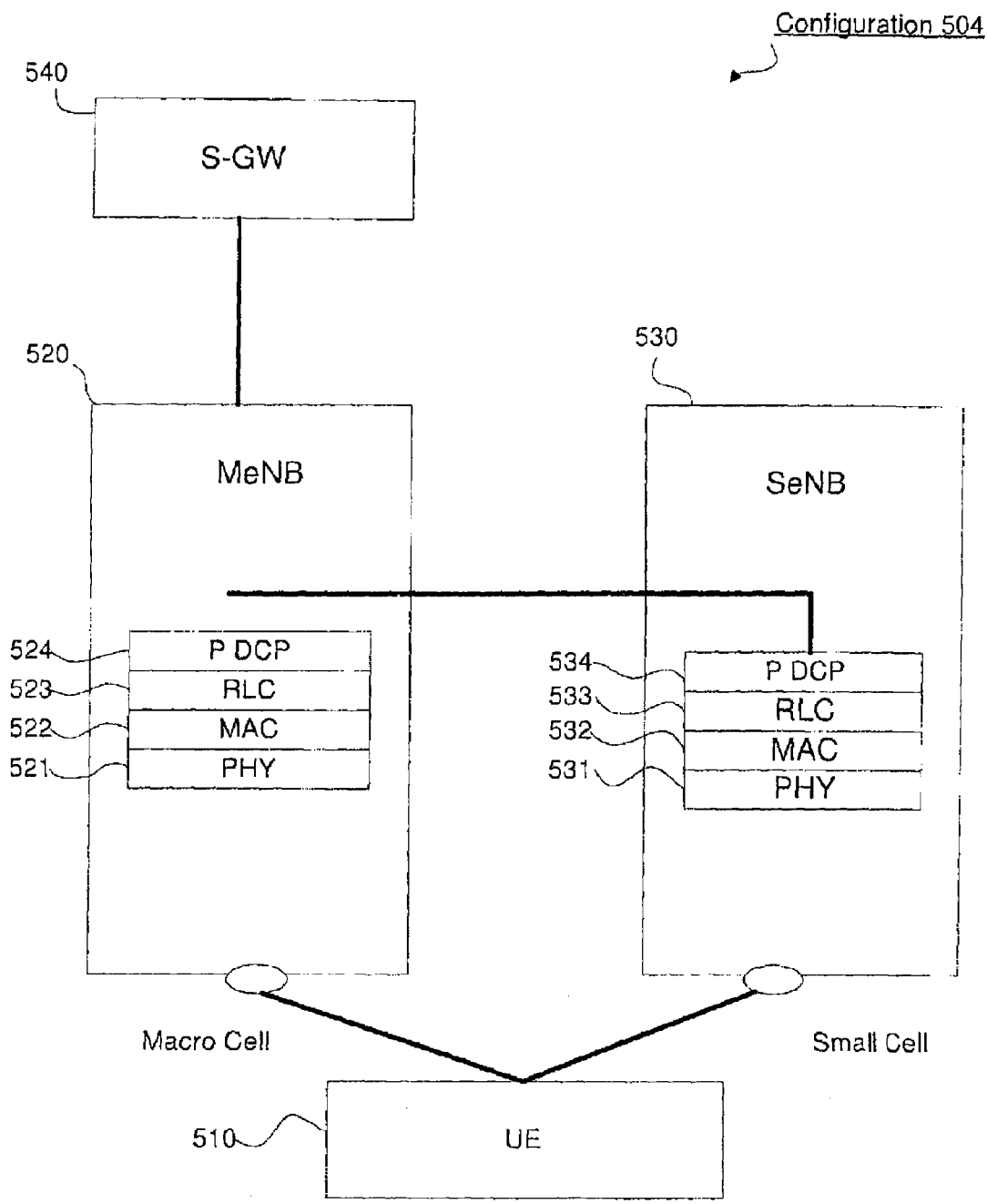

FIG. 5D shows a configuration 504 where the SeNB 530 includes the physical layer 531, the MAC layer 532, the RLC layer 533 and a PDCP layer 534. In this case, either of the PDCP layers 524/534 may receive PDUs from upper level layers for transmission. Similar to the configuration 503 of FIG. 5C, since the MAC, RLC and PDCP layers are distributed between the MeNB 520 and SeNB 530, the X2 interface links need to be used to coordinate how the upper level layer PDUs are sent to the different PDCP layers 524/534.

FIG. 6 shows an exemplary system 600 for providing creating several subflows within a flow a data for an enhanced base station (e.g., eNodeB) and a device (e.g., UE). It may be noted that exemplary system 600 may be implemented within both the UE and the eNodeB. As illustrated in FIG. 6, the plurality of subflows may include information such as a priority setting (e.g., high, medium, low), a delay budget (e.g., derived from a QoS class identifier ("QCI") table), and holding time, wherein an initial holding time may be set to equal the delay budget associated with the flow. Accordingly, the holding time may be decremented depending upon how long a packet is stored in a buffer.

The exemplary system 600 may include a flow classifier 610, a tagger/subflow classifier 620, a modified MAC layer 630 and a physical layer 640. IP packets may be received at the flow classifier 610 and traverse 3GPP logical channels to the tagger/subflow classifier 620. At the tagger/subflow classifier 620, the eNodeB may tag DL packets and the UE may tag UL packets. The tagging may be based on a categorized priority level designated for each packet. For instance, the UE and eNodeB may utilize a set of rules for categorizing DL/UL packets into various priority groups. High priority classification may include packets such as retransmitted RLC PDUs, RLC status update, ROHC feedback, etc. Medium priority classification may include packets such as user data containing TCP-ACK, RTCP feedback, video I-frame, etc. Low priority classification may include packets such as user data containing new data.

After tagging, the IP packets may traverse tagged logical channels to the modified MAC layer 630 for mapping MAC PDUs to individual carriers at the physical layer 640. The MAC layer 630 may utilize per-flow delay budget to aggregate multiple packets into one MAC PDU. In addition, when the holding time of a packet approaches the delay budget available for scheduling, the urgency for sending packet may increase.

If the holding time of packets reaches a first predetermined threshold (e.g., 25% of the delay budget), then the MAC layer 630 may start sending MAC frames with retransmitted RLC PDUs on a carrier having better channel quality. IF the holding time of packets reaches a further threshold (e.g., 50% of the delay budget), then the MAC layer 630 may start sending MAC frames over the carrier with better channel quality and sending redundant frames on other carrier. The eNodeB MAC may send the same PDU across the two carriers in order for the UE to combine the information sent. The MAC layer 630 may identify carrier quality based on channel quality metrics defined by the 3GPP specifications. Furthermore, when the packet delay exceeds the delay budget, the MAC layer 630 may discard the packet. The expecting receiver may also discard the packet if the packet is not receiving in a timely manner.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A user equipment (UE), comprising:
a processor implementing a first network stack that corresponds to a first cell comprising a packet data convergence protocol ("PDCP") layer and a first radio link control ("RLC") layer, and implementing a second network stack that corresponds to a second cell comprising a second RLC layer, the processor selecting a first data packet for transmission to the first cell via the first network stack and selecting a second data packet for transmission to the second cell via the second network stack, wherein the second network stack receives the second data packet from the PDCP layer of the first network stack; and
a transmitter to transmit the first and second data packets.

2. The user equipment of claim 1, wherein the PDCP layer has dual connectivity between the first network stack and the second network stack.

3. The user equipment of claim 1, wherein the first network stack further comprises:
a media access control ("MAC") layer; and
a physical ("PHY") layer.

4. The user equipment of claim 1, wherein the second network stack further comprises:
a media access control ("MAC") layer; and
a physical ("PHY") layer.

5. The user equipment of claim 1, wherein the first and second data packets comprise an indication of a level of priority.

6. The user equipment of claim 5, wherein the level of priority is indicated by the PDCP layer.

7. The user equipment of claim 5, wherein the level of priority for the first data packet is indicated by the first RLC layer.

8. A base station, comprising:
a processor implementing a plurality of network layers, the plurality of network layers comprising:
a packet data convergence protocol ("PDCP") layer;
a first radio link control ("RLC") layer;
wherein the PDCP layer has dual connectivity with the first RLC layer and a second RLC layer of a secondary cell; and
wherein the PDCP layer sends data packets to the first RLC layer of the base station and the second RLC layer of the secondary cell; and
a transmitter to transmit the data packets received by the first RLC layer.

9. The base station of claim 8, wherein an X2 interface is used for coordination between the first RLC layer and the second RLC layer.

10. The base station of claim 8, wherein the plurality of network layers further comprises:
a media access control ("MAC") layer; and
a physical ("PHY") layer.

11. The base station of claim 8, wherein the secondary cell further comprises:
a media access control ("MAC") layer; and
a physical ("PHY") layer.

12. The base station of claim 8, wherein the transmitter further transmits a signal to a user equipment ("UE") indicating for the UE to combine the data packets received from the base station and the secondary cell.

13. The base station of claim 8, wherein each of the data packets comprise an indication of a level of priority.

14. The base station of claim 13, wherein the level of priority is indicated by the PDCP layer.

15. The base station of claim 13, wherein the level of priority for a first data packet is indicated by the first RLC layer.

16. An integrated circuit, comprising:
circuitry to implement a first network stack that corresponds to a first cell comprising a first packet data convergence protocol ("PDCP") layer and a first radio link control ("RLC") layer, and to implement a second network stack that corresponds to a second cell comprising a second RLC layer,
circuitry to select a first data packet for transmission to the first cell via the first network stack and select a second data packet for transmission to the second cell via the second network stack, wherein the second network stack receives the second data packet from the first PDCP layer of the first network stack; and
circuitry to transmit the first and second data packets.

17. The integrated circuit of claim 16, wherein the PDCP layer has dual connectivity between the first network stack and the second network stack.

18. The integrated circuit of claim 16, wherein the first and second data packets comprise an indication of a level of priority.

19. The integrated circuit of claim 18, wherein the level of priority is indicated by the PDCP layer.

20. The integrated circuit of claim 18, wherein the level of priority for the first data packet is indicated by the first RLC layer.

* * * * *